United States Patent
Xu et al.

(10) Patent No.: US 12,058,689 B2
(45) Date of Patent: Aug. 6, 2024

(54) REDUCING THE OVERHEAD OF TRACKING REFERENCE SIGNAL (TRS) CONFIGURATIONS FOR IDLE/INACTIVE USER EQUIPMENTS (UES)

(71) Applicant: Apple Inc., Cupertino, CA (US)

(72) Inventors: Fangli Xu, Beijing (CN); Sethuraman Gurumoorthy, San Ramon, CA (US); Huaning Niu, San Jose, CA (US); Yushu Zhang, Beijing (CN); Chunhai Yao, Beijing (CN); Wei Zeng, Saratoga, CA (US); Haitong Sun, Cupertino, CA (US); Weidong Yang, San Diego, CA (US); Dawei Zhang, Saratoga, CA (US); Sigen Ye, Whitehouse Station, NJ (US)

(73) Assignee: APPLE INC., Cupertino, CA (US)

( * ) Notice: Subject to any disclaimer, the term of this patent is extended or adjusted under 35 U.S.C. 154(b) by 89 days.

(21) Appl. No.: 17/439,603

(22) PCT Filed: Mar. 31, 2021

(86) PCT No.: PCT/CN2021/084287
§ 371 (c)(1),
(2) Date: Sep. 15, 2021

(87) PCT Pub. No.: WO2022/205033
PCT Pub. Date: Oct. 6, 2022

(65) Prior Publication Data
US 2023/0199778 A1 Jun. 22, 2023

(51) Int. Cl.
*H04W 72/23* (2023.01)
*H04L 1/00* (2006.01)
(Continued)

(52) U.S. Cl.
CPC .......... *H04W 72/23* (2023.01); *H04L 1/0061* (2013.01); *H04L 5/0048* (2013.01);
(Continued)

(58) Field of Classification Search
CPC ............. H04W 72/23; H04W 72/0446; H04W 72/0466; H04W 76/27; H04W 72/044;
(Continued)

(56) References Cited

U.S. PATENT DOCUMENTS

2019/0052443 A1* 2/2019 Cheng ................... H04L 5/0023
2021/0044401 A1 2/2021 Yoon et al.

FOREIGN PATENT DOCUMENTS

CN 108141341 A 6/2018
CN 109863706 A 6/2019
(Continued)

OTHER PUBLICATIONS

International Search Report mailed Dec. 10, 2021 for International Application No. PCT/CN2021/084287; 4 pages.
(Continued)

*Primary Examiner* — Thai Nguyen
(74) *Attorney, Agent, or Firm* — Sterne, Kessler, Goldstein & Fox P.L.L.C.

(57) ABSTRACT

An approach to reduce the signaling overhead for tracking reference signal (TRS) configuration signaling to idle and inactive user equipments (UEs) operating in a wireless communication system. Conventional signaling approaches require more bits that can be conveyed in the maximum system information block (SIB) message size. One proposed approach optimizes the signaling by removing unnecessary or redundant information, using a single TRS configuration to replace multiple configurations, size reduction in some fields, and the sharing of some fields across different TRS configurations. Another proposed approach uses an SIB
(Continued)

message to carry the TRS configurations for a particular beam or subset of beams. These two proposed approaches may be combined to provide further optimization possibilities.

20 Claims, 9 Drawing Sheets

(51) Int. Cl.
  *H04L 5/00* (2006.01)
  *H04W 72/044* (2023.01)
  *H04W 72/0446* (2023.01)
(52) U.S. Cl.
  CPC ....... *H04L 5/0094* (2013.01); *H04W 72/0446* (2013.01); *H04W 72/0466* (2013.01)
(58) Field of Classification Search
  CPC ............. H04W 56/0015; H04L 1/0061; H04L 5/0048; H04L 5/0094; H04L 5/0023; H04L 5/0051
  See application file for complete search history.

(56) References Cited

FOREIGN PATENT DOCUMENTS

| | | | |
|---|---|---|---|
| CN | 110268777 A | 9/2019 | |
| CN | 112534786 A | 3/2021 | |
| WO | WO-2021205415 A1 * | 10/2021 | ............. H04L 5/005 |
| WO | WO-2022084896 A1 * | 4/2022 | ........... H04L 5/0051 |

OTHER PUBLICATIONS

Written Opinion mailed Dec. 10, 2021 for International Application No. PCT/CN2021/084287; 4 pages.
3GPP 3$^{rd}$ Generation Partnership Project: Technical Specification Group Radio Access Network; 5GS; User Equipment (UE) conformance specification; Part 1: Common test environment (Release 15) 3GPP TS 38.508-1 V1.0.0 May 31, 2018; 137 pages.
3GPP 3$^{rd}$ Generation Partnership Project: Technical Specification Group Radio Access Network; NR; Physical layer procedures for data (Release 16) 3GPP TS 38.214 V16.4.0 Dec. 31, 2020; 169 pages.

* cited by examiner

FIG. 4

```
TRS-ResourceList ::=      SEQUENCE (SIZE (1..maxNrofTRS-Resources)) OF TRS-Resource TRS-Resource ::=          SEQUENCE {
  trs-ResourceId
  frequencyDomainAllocation
  firstOFDMSymbolInTimeDomain
  freqBand
  powerControlOffsetSS
  scramblingID
  periodicityAndOffset
  qcl-InfoSSBIndex
  numOfSlots
  ...
}

CSI-FrequencyOccupation ::=   SEQUENCE {
  startingRB
  nrofRBs
  ...
}
```

FIG. 6

```
TRS-ResourceList ::=            SEQUENCE {
    commonFreqBand
    SEQUENCE (SIZE (1..maxNrofTRS-Resources)) OF TRS-Resource,
    ...
}

TRS-Resource ::=                SEQUENCE {
    trs-ResourceId
    frequencyDomainAllocation
    firstOFDMSymbolInTimeDomain
    specificFreqBand
    powerControlOffsetSS
    scramblingID
    periodicityAndOffset
    qcl-InfoSSBIndex
    numOfSlots
    ...
}

CSI-FrequencyOccupation ::=     SEQUENCE {
    startingRB
    nrofRBs
    ...
}
```

*FIG. 7*

REDUCING THE OVERHEAD OF TRACKING REFERENCE SIGNAL (TRS) CONFIGURATIONS FOR IDLE/INACTIVE USER EQUIPMENTS (UES)

CROSS REFERENCE TO RELATED APPLICATIONS

This application is a National Stage application under 35 U.S.C. § 371 of International Application No. PCT/CN2021/084287, having an International Filing Date of Mar. 31, 2021.

BACKGROUND

Field

Various aspects generally may relate to the field of wireless communications.

SUMMARY

Aspects of the approach described herein include a user equipment (UE). The UE includes a radio frequency (RF) receiver configured to receive a downlink signal from a base station. The UE also includes processing circuitry coupled to the RF receiver, the processing circuitry configured to decode the downlink signal, wherein the downlink signal includes one or more Tracking Reference Signal (TRS) configurations, at least one TRS configuration described by a respective TRS information element, the respective TRS information element including one or more of the following parameters: a first parameter indicating an index of the TRS-Resource; a second parameter indicating a frequency domain allocation using 2 bits; a third parameter using 4 bits to indicate location of a first symbol in a slot; a fourth parameter using 2 bits indicating a ratio of energy or power; a fifth parameter indicating a scrambling index of a Channel State Information Reference Signal (CSI-RS) sequence; a sixth parameter indicating a transmission period and a slot offset of a CSI-RS resource; a seventh parameter using no more than 6 bits, and indicating a corresponding synchronization signal block (SSB) index; and an eighth parameter using 1 bit, and indicating a number of slots, the number of slots indicating whether the TRS configuration is a 1-slot configuration or a 2-slot configuration. The processing circuitry of the UE is further configured, using the TRS configuration and the RF receiver, to track at least one of time or frequency, wherein the downlink signal is received while in an inactive or idle condition.

Aspects of the approach also include a method that includes the step of receiving, by a radio frequency (RF) receiver in a user equipment (UE), a downlink signal from a base station. The method further includes decoding, by processing circuitry coupled to the RF receiver, the downlink signal, wherein the downlink signal includes one or more tracking reference signal (TRS) configurations, at least one TRS configuration described by a respective TRS information element, the respective TRS information element including one or more of the following parameters: a first parameter indicating an index of the TRS-Resource; a second parameter indicating a frequency domain allocation using 2 bits; a third parameter using 4 bits to indicate location of a first symbol in a slot; a fourth parameter using 2 bits indicating a ratio of energy or power; a fifth parameter indicating a scrambling index of a channel state information reference signal (CSI-RS) sequence; a sixth parameter indicating a transmission period and a slot offset of a CSI-RS resource; a seventh parameter using no more than 6 bits, and indicating a corresponding SSB index; and an eighth parameter using 1 bit, and indicating a number of slots, the number of slots indicating whether the TRS configuration is a 1-slot configuration or a 2-slot configuration. The method further includes tracking, by the processing circuitry and using the TRS configuration, at least one of time or frequency, wherein the downlink signal is received while in an inactive or idle condition.

Aspects of the approach described herein include a base station. The base station includes a radio frequency (RF) transmitter configured to transmit a downlink signal to a UE. The base station also includes processing circuitry coupled to the RF transmitter, the processing circuitry configured to encode the downlink signal, wherein the downlink signal includes one or more Tracking Reference Signal (TRS) configurations, at least one TRS configuration described by a respective TRS information element, the respective TRS information element including one or more of the following parameters: a first parameter indicating an index of the TRS-Resource; a second parameter indicating a frequency domain allocation using 2 bits; a third parameter using 4 bits to indicate location of a first symbol in a slot; a fourth parameter using 2 bits indicating a ratio of energy or power; a fifth parameter indicating a scrambling index of a Channel State Information Reference Signal (CSI-RS) sequence; a sixth parameter indicating a transmission period and a slot offset of a CSI-RS resource; a seventh parameter using no more than 6 bits, and indicating a corresponding synchronization signal block (SSB) index; and an eighth parameter using 1 bit, and indicating a number of slots, the number of slots indicating whether the TRS configuration is a 1-slot configuration or a 2-slot configuration. The downlink signal is transmitted to the UE while the UE is in an inactive or idle condition, such that the UE can track at least one of time or frequency using the TRS configuration.

Aspects of the approach also include a method that includes the step of transmitting, by a radio frequency (RF) transmitter in a base station, a downlink signal to a user equipment (UE). The method further includes encoding, by processing circuitry coupled to the RF transmitter, the downlink signal, wherein the downlink signal includes one or more tracking reference signal (TRS) configurations, at least one TRS configuration described by a respective TRS information element, the respective TRS information element including one or more of the following parameters: a first parameter indicating an index of the TRS-Resource; a second parameter indicating a frequency domain allocation using 2 bits; a third parameter using 4 bits to indicate location of a first symbol in a slot; a fourth parameter using 2 bits indicating a ratio of energy or power; a fifth parameter indicating a scrambling index of a channel state information reference signal (CSI-RS) sequence; a sixth parameter indicating a transmission period and a slot offset of a CSI-RS resource; a seventh parameter using no more than 6 bits, and indicating a corresponding SSB index; and an eighth parameter using 1 bit, and indicating a number of slots, the number of slots indicating whether the TRS configuration is a 1-slot configuration or a 2-slot configuration. The method further includes the downlink signal is transmitted to the UE while the UE is in an inactive or idle condition, so that the UE track at least one of time or frequency using the TRS configuration.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 4 illustrates a conventional CSI-RS resource configuration information element in a listing format.

FIG. 6 illustrates a TRS resource configuration information element, according to some aspects of this disclosure.

FIG. 7 illustrates a TRS resource configuration information element, according to some aspects of this disclosure.

Figure 1:
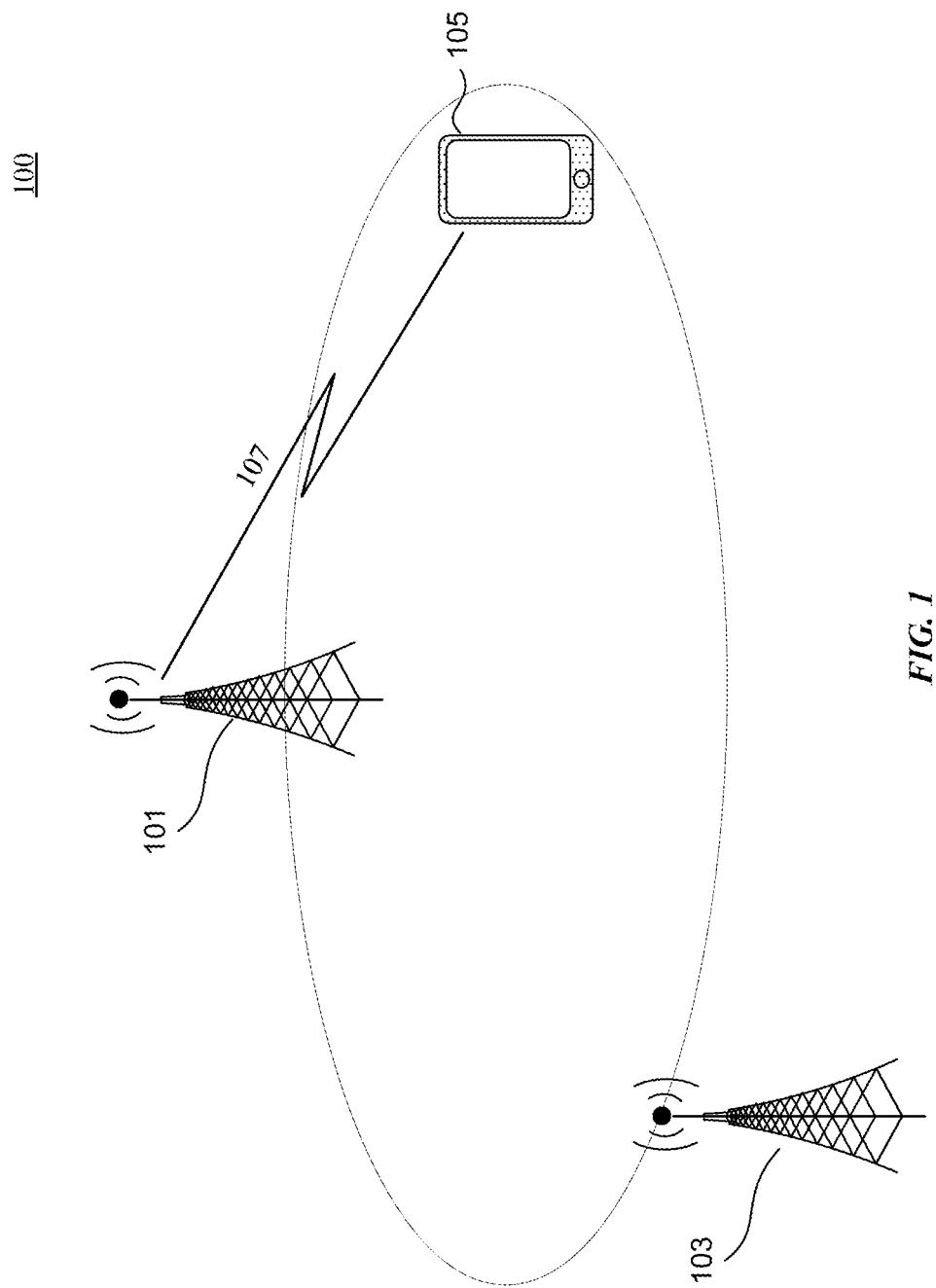
FIG. 1 illustrates an example system implementing mechanisms for signaling TRS configurations, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

FIG. 1 illustrates an example system implementing mechanisms for signaling TRS configurations, according to some aspects of the disclosure. Example system 100 is provided for the purpose of illustration only and does not limit the disclosed aspects. System 100 may include, but is not limited to, network nodes (for example, base stations such as eNBs) 101 and 103 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can include an electronic device configured to operate using the 3GPP standards. UE 105 can include, but is not limited to, as wireless communication devices, smart phones, laptops, desktops, tablets, personal assistants, monitors, televisions, wearable devices, Internet of Things (IoTs), vehicle's communication devices, and the like. Network node 101 (herein referred to as a base station) can include nodes configured to operate based on a wide variety of wireless communication techniques such as, but not limited to, techniques based on 3GPP standards.

According to some aspects, UE 105 and base stations 101 and 103 are configured to implement mechanisms for UE 105 to receive signaling of TRS configurations. In some aspects, UE 105 is configured to receive signaling of TRS configurations, and to perform time and/or frequency tracking based on those TRS configurations. According to some aspects, UE 105 can be connected to and can be communicating with base station 101 (e.g., the serving cell) using carrier 107 from which UE 105 receives the signaled TRS configurations.

According to some aspects, UE 105 can measure one or more carriers (e.g., carrier 107) used for communication with base station 101 (e.g., the serving cell) to perform time and/or frequency tracking based on those TRS configurations.

Figure 2:
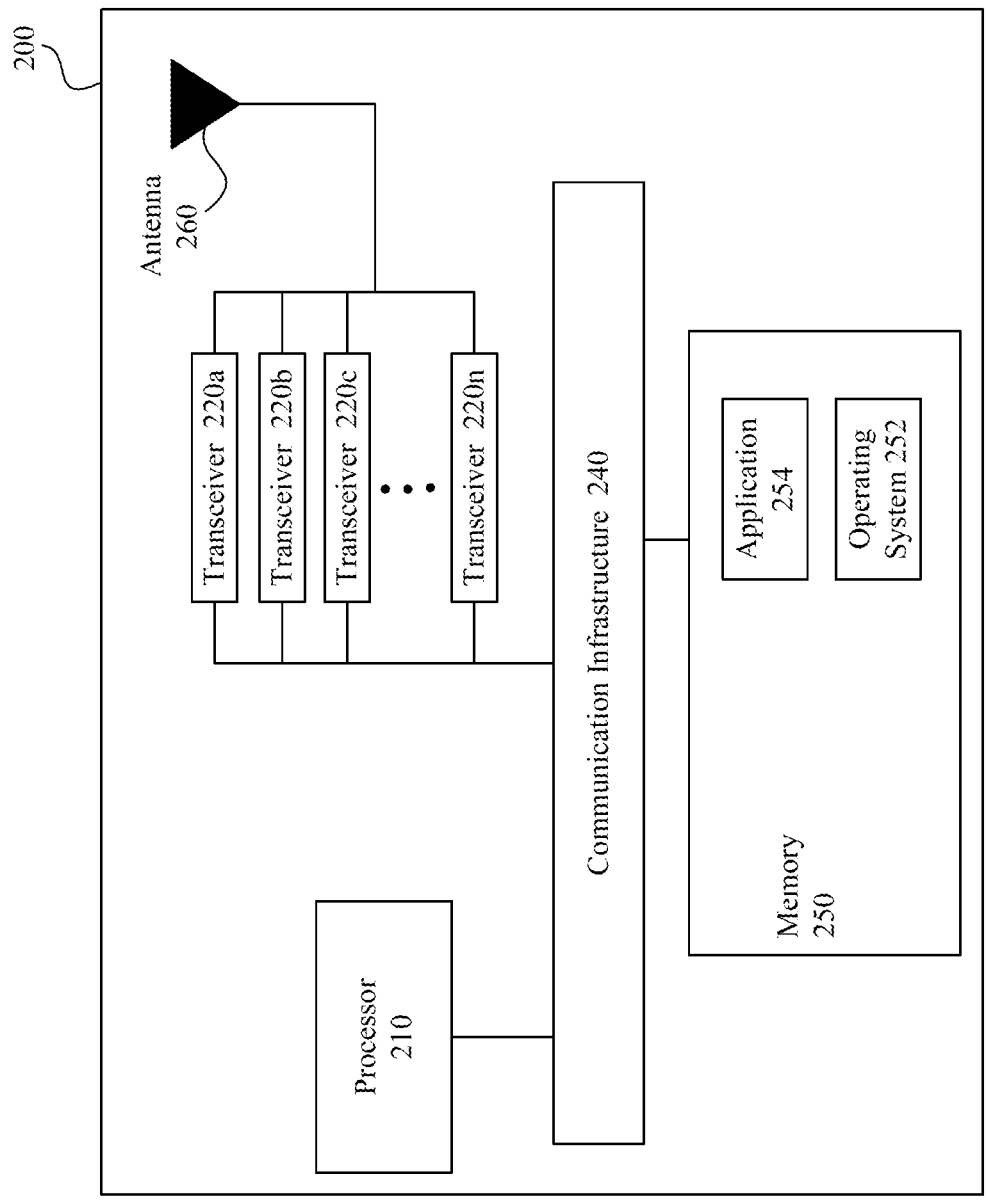
FIG. 2 illustrates a block diagram of an example system of an electronic device receiving and processing the signaled TRS configurations, according to some aspects of the disclosure.

FIG. 2 illustrates a block diagram of an example system 200 of an electronic device implementing mechanisms for time and/or frequency tracking based on signaled TRS configurations, according to some aspects of the disclosure. System 200 may be any of the electronic devices (e.g., base station 101, UE 105) of system 100. System 200 includes processor 210, one or more transceivers 220a-220n, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus.

Processor 210 together with instructions stored in memory 250 performs operations enabling system 200 of system 100 to implement mechanisms for exchanging a searcher number for carrier/cell detection and measurement, as described herein. Additionally, or alternatively, one or more transceivers 220a-220n perform operations enabling system 200 of system 100 to implement mechanisms for performing time and/or frequency tracking based on those TRS configurations, as described herein.

One or more transceivers 220a-220n transmit and receive communications signals that support mechanisms for performing time and/or frequency tracking based on those TRS configurations, according to some aspects, and may be coupled to antenna 260. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, buffers, and like circuits/devices used for connecting to and communication on networks. According to some examples, one or more transceivers 220a-220n include one or more circuits to connect to and communicate on wired and/or wireless networks.

According to some aspects, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a WLAN transceiver) to enable connection(s) and communication over WLAN networks such as, but not limited to, networks based on standards described in IEEE 802.11. Additionally, or alternatively, one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220a-220n can be configured to operate according to one or more of Rel-15, Rel-16, Rel-17, or other of the 3GPP standard.

According to some aspects, processor 210, alone or in combination with computer instructions stored within memory 250, and/or one or more transceiver 220a-220n, implements performing time and/or frequency tracking based on those TRS configurations, as discussed herein. For example, transceiver 220a can enable connection(s) and communication over a first carrier (for example, carrier 107 of FIG. 1). In this example, transceiver 220a and/or transceiver 220b can enable reception of signaling of TRS configuration information (for example, carrier 109 of FIG. 1). Additionally, or alternatively, wireless system 200 can include one transceiver configured to operate at different carriers. Processor 210 can be configured to control the one transceiver to switch between different carriers, according to some examples. Although the operations discussed herein are discussed with respect to processor 210, it is noted that processor 210, alone or in combination with computer instructions stored within memory 250, and/or one or more transceiver 220a-220n, can implement these operations.

In the on-going development of wireless systems, there are on-going challenges to consider the impact of wireless communication protocol requirements with a view to continual improvement of the performance of the wireless system and of the user experience. Improvement considerations include improved power usage and power saving of user equipment (UE) devices so as to extend battery life, for example. In particular, the impact of enhancements to wireless communication systems for UEs when in an idle and/or inactive-mode are important considerations with respect to power saving and system performance aspects. As part of understanding the impact, paging enhancements to reduce unnecessary UE paging reception without an impact to legacy UEs are also relevant considerations.

In furtherance of meeting the above challenges, aspects herein provide a number of approaches that specify potential TRS/CSI-RS occasion(s), which may be available to UEs in connected mode, to idle and inactive-mode UEs, while minimizing the impact to the system overhead of the signaling of the wireless system. In developing aspects of various approaches herein, it is noted that an "always-on" TRS/CSI-RS transmission by gNodeB may not be required.

In developing aspects of possible approaches herein, it is noted that the TRS/CSI-RS configurations can be provided in SIB signaling. Possible approaches to SIB signaling include the introduction of a separate SIB to carry the TRS/CSI-RS configurations. Other possible approaches to SIB signaling include using an existing SIB to carry the TRS/CSI-RS configurations.

One important factor to be considered in the various aspects herein is the size of TRS/CSI-RS configurations, and what approaches can reduce the signaling overhead so that the wireless communication of the TRS/CSI-RS configurations can be carried efficiently.

Figure 3:
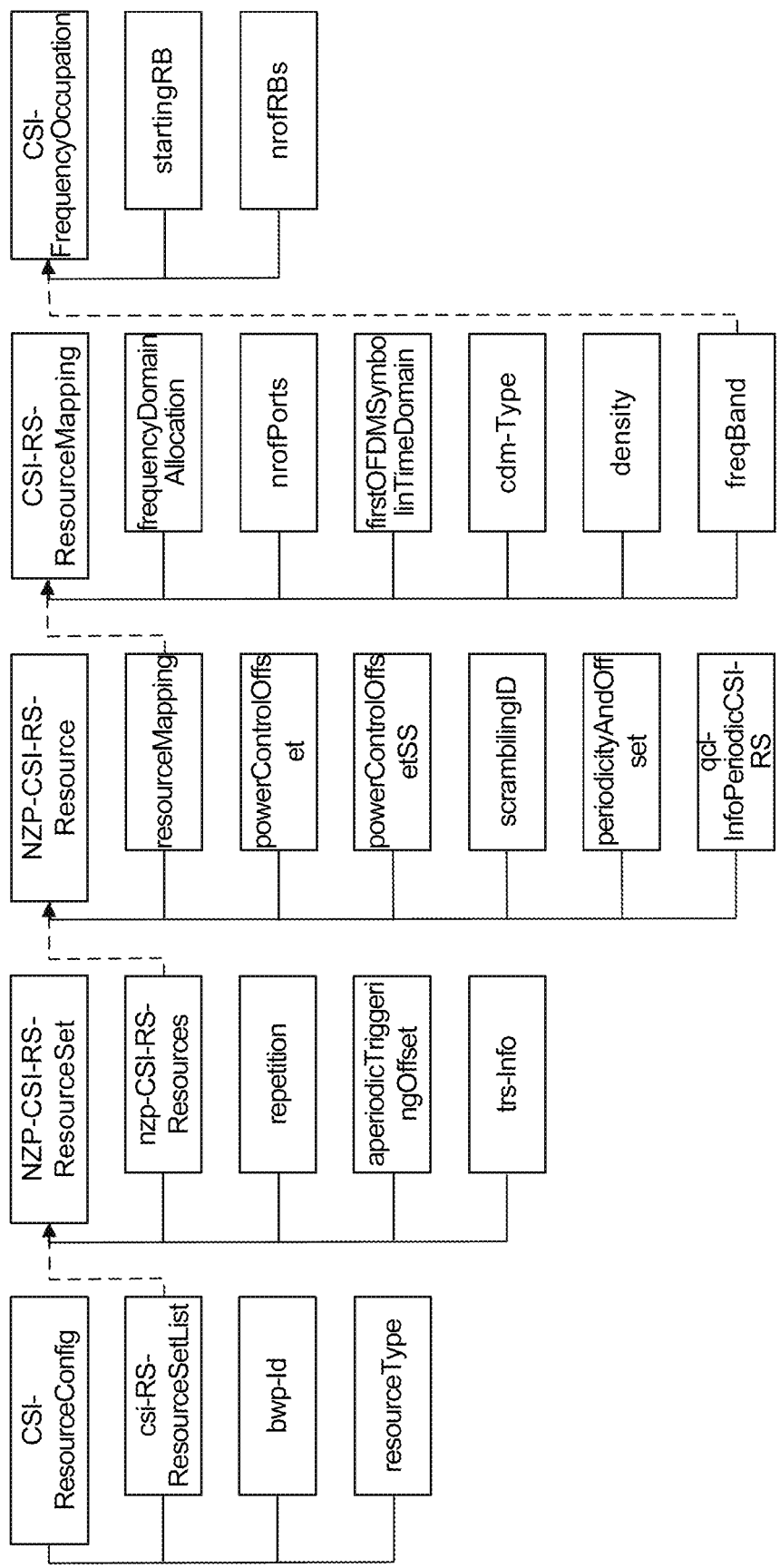
FIG. 3 illustrates a conventional CSI-RS resource configuration information element in a graphical format.

FIG. 3 illustrates a conventional CSI-RS resource configuration information element in graphical form. This conventional approach to TRS configuration information signaling requires a large number of information sub-elements, as shown in FIG. 3. As shown in FIG. 3, the CSI_ResourceConfig has sub-elements of csi-RS-ResourceSetList, bwp-Id and resourceType. The csi-RS-ResourceSetList in turn has sub-elements of nzp-CSI-RS-Resources, repetition, aperiodicTriggeringOffset and trs-Info. Continuing with the hierarchy of information elements, the NZP-CSI-RS-Resource element has sub-elements of resourceMapping, powerControlOffset, powerControlOffsetSS, scramblingID, periodicityAndOffset, and qcl-InfoPeriodicCSI-RS. And in turn, CSI-RS-ResourceMapping has the following sub-elements of frequencyDomainAllocation, nrofPorts, firstOFDMSymbolinTimeDomain, cdm-Type, density and freqBand. Finally, freqBand has as its sub-elements CSI-FrequencyOccupation with startingRB and nrofRBs.

FIG. 4 illustrates a conventional CSI-RS resource configuration information element in a listing format. FIG. 4 is similar to FIG. 3 but shown in a listing format, rather than a graphical format. As noted with respect to FIG. 3, this conventional approach to TRS configuration information signaling requires a large number of information sub-elements. As shown in FIG. 4, the CSI_ResourceConfig has sub-elements of csi-RS-ResourceSetList, bwp-Id and resourceType. The csi-RS-ResourceSetList in turn has sub-elements of nzp-CSI-RS-Resources, repetition, aperiodicTriggeringOffset and trs-Info. Continuing with the hierarchy of information elements, the NZP-CSI-RS-Resource element has sub-elements of resourceMapping, powerControlOffset, powerControlOffsetSS, scramblingID, periodicityAndOffset. and qcl-InfoPeriodicCSI-RS. And in turn, CSI- RS-ResourceMapping has the following sub-elements of frequencyDomainAllocation, nrofPorts, firstOFDMSymbolInTimeDomain, cdm-Type, density and freqBand. Finally, freqBand has as its sub-elements CSI-Frequency-Occupation with startingRB and nrofRBs.

Figure 5:
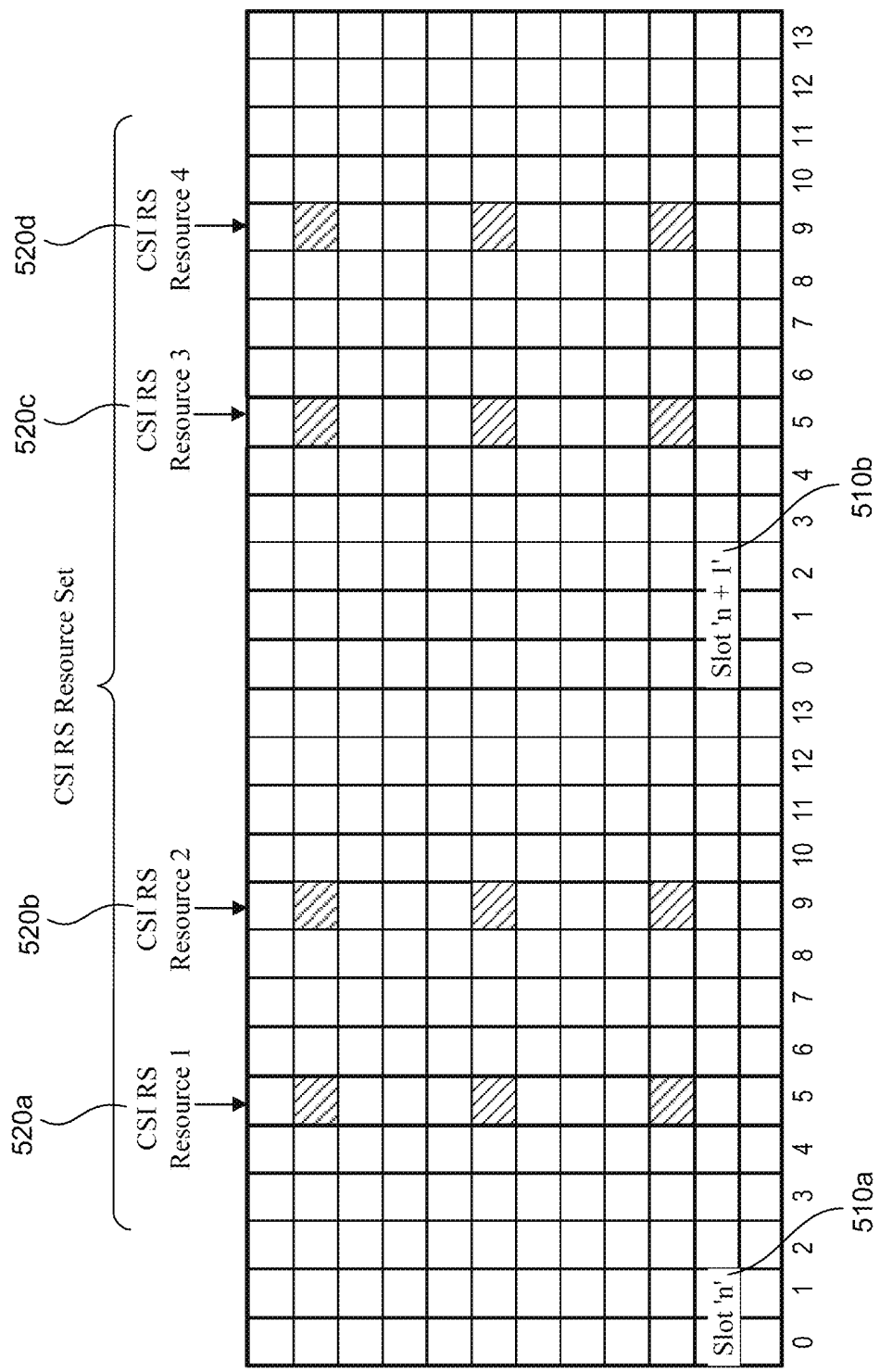
FIG. 5 illustrates a TRS resource map in two slots, according to some aspects of this disclosure.

FIG. 5 illustrates a slot resource map for one resource block, according to some aspects of this disclosure. FIG. 5 shows a 2-slot resource signal resource layout, with first slot 510a and second slot 510b. In FIG. 5, the CSI Resource Set has four resources, CSI RS Resource 1 (520a), CSI RS Resource 2 (520b), CSI RS Resource 3 (520c), and CSI RS Resource 4 (520d). CSI RS Resource 1 (520a) and CSI RS Resource 2 (520b) are in first slot 510a. CSI RS Resource 3 (520c) and CSI RS Resource 4 (520d) are in second slot 510b. In each resource set, there are three resource elements, all at a particular OFDM symbol location (e.g., 5 and 9), but with a separate subcarrier position with the resource block.

In some aspects of this disclosure, the focus is on TRS configuration approaches that support UEs in either the idle or inactive mode. The reason for this focus results from the fact that using a TRS configuration approach is suitable for assisting UE devices in time and/or frequency tracking.

In terms of efficiency of wireless configuration communication, the challenge may be described as follows. Currently, a full TRS configuration is signaled via a NZP CSI-RS resource set (NZP-CSI-RS-ResourceSet) with either 2 or 4 NZP CSI-RS resources (NZP-CSI-RS-Resource). With the conventional signaling approach, one TRS configuration requires signaling that uses approximately 48 bytes (assuming 4 NZP CSI-RS resources for a TRS configuration) or 26 bytes (assuming 2 NZP CSI-RS resources for a TRS configuration). With a maximum of 64 beams and with the assumption of one TRS configuration per beam, the total size for the conventional signaling approach may be calculated as follows: 64 beams×48 bytes per beam equals 3072 bytes (for the 4 NZP CSI-RS resources for a TRS configuration), or 64 beams×26 bytes per beam equals 1664 bytes (for the 2 NZP CSI-RS resources for a TRS configuration). Converting from bytes to bits, 24,576 bits are required for the 4 NZP CSI-RS resources for a TRS configuration, or 13,312 bits are required for the 2 NZP CSI-RS resources for a TRS configuration. Such a large number of bits is not feasible, or at least is very inefficient. The current limit for an SIB message size of 2976 bits. 3GPP specification TS 38.214 states that the UE is not expected to receive a PDSCH assigned by a PDCCH with cyclic redundancy check (CRC) scrambled by SI-RNTI with a TBS to exceed 2976 bits. 3GPP specification TS 38.331 confirms the requirement by stating that the physical layer imposes a limit to the maximum size a SIB can take. The maximum SIB1 or SI message size is 2976 bits. Furthermore, segmentation is not currently supported for SIB messaging.

Consequently, reusing the existing or conventional signaling approach for TRS configuration indication for idle and inactive UEs results in message size that is too large to be carried in a SIB message. Furthermore, even if SIB segmentation were to be introduced, it is still desirable to reduce the signaling overhead by innovation in creating approaches that reduce the message size while providing the necessary TRS configuration information.

The various aspects provided herein address the signaling of TRS configurations so that the signaling of these TRS configurations can be carried out efficiently, with minimal overhead. In the first approach, reduction in the number of bits of the signal for the TRS configurations is examined and innovations are devised. In various aspects of the first approach, this involves one or more of the following: removing unnecessary fields or redundant information in the signaling, using a single TRS configuration to replace multiple CSI-RS resource configurations, size optimization for the fields, and/or sharing some fields across different TRS configurations.

In various aspects of the second approach, signaling in different beams carries different information. Thus, signaling efficiency may be realized by having the system information bus (SIB) in one beam carry only the TRS configurations for that particular beam or a subset of beams that includes the particular beam. Since the number of TRS configurations associated with a particular beam or subset of beams is less than the total number of possible TRS configurations, this second approach reduces the TRS configuration messaging size.

As discussed further herein, aspects of each of the two approaches yields innovative improvements in signaling efficiency for TRS configurations. It is further noted that aspects of the two approaches may be combined to yield further signaling efficiency improvements. In addition, it is noteworthy that both of the approaches above are applicable regardless of which signaling message carries the TRS configurations (i.e., whether it is SIB or RRC dedicated signaling). Furthermore, the above two approaches may be used to reduce the signaling overhead even if SIB segmentation is supported.

Option 1: Signaling Optimization for the TRS Configurations

In developing aspects of the first approach, it is noted that the TRS configuration is a special type of CSI-RS configuration, which presents numerous opportunities for signaling optimization. The potential optimization opportunities include at least the following opportunities: (a) recognizing and removing all the unnecessary parameters; (b) recognizing the absence of a need for certain parameters; and (c) the use of a single TRS configuration instead of multiple NZP CSI-RS resources. With respect to recognizing the absence of a need for certain parameters, it is noted that many parameters in a CSI-RS configuration are not applicable or are not needed for a periodic TRS configuration. For these parameters that are not applicable or not needed (e.g., optional), these parameters can be removed. Such parameters include for example: repetition, trs-Info, nrofPorts, firstOFDMSymbolInTimeDomain2, cdm-Type, density, powerControlOffset in addition to parameters that are already optional, e.g., aperiodicTriggeringOffset.

Referring to FIG. 5, the example shows a 2-slot reference signal configuration, which uses 4 NZP CSI-RS resources for the configuration signaling. However, there is a lot of redundant or unnecessary information that is carried in configuration signaling for the 4 NZP CSI-RS resource configurations. A single TRS configuration can be defined that covers the required signal configuration for all of the 2 CSI-RS resources or the 4 CSI-RS resources. In various aspects, the needed parameters for the single TRS configuration include, for example, frequencyDomainAllocation, firstOFDMSymbolInTimeDomain, freqBand (RB indication), powerControlOffsetSS, scramblingID, periodicityAndOffset, QCL indication, and the number of slots. The number of slots (1 or 2) indicates whether the configuration is a 1-slot TRS configuration or a 2-slot TRS configuration. The firstOFDMSymbolInTimeDomain parameter indicates the symbol index of the first TRS symbol in the slot. In the configuration, the second TRS symbol in the slot is 4 symbols away from the first TRS symbol.

As described above, aspects of various approaches include recognizing and removing all the unnecessary parameters of the configuration signaling. Alternatively, or in addition to, the size (e.g., bit size) of one or more parameters can be further reduced. For example, the parameter in a TRS configuration, frequencyDomainAllocation, may be communicated with only 2 bits to indicate the resource element (RE) offset of 0, 1, 2 or 3.

For the parameter QCL indication, instead of the using the conventional TCI signaling structure, the QCL information can be more simply indicated as the corresponding SSB index. This is because the particular SSB is the only reference available to idle/inactive UEs. With up to 64 SSB beams available in a TRS configuration, the parameter QCL indication requires a maximum of 6 bits. In a further simplification, the actual bit-width for the QCL information can be determined based on the actual number of SSB beams. The actual number of SSB beams is indicated by ssb-PositionsInBurst in SIB1. If 4 SSB beams are available, then 2 bits are sufficient to signal the QCL indication information for the TRS configuration.

For the parameter freqBand, the conventional approach includes two fields of information: startingRB (0 to 274) and nrofRBs (24 to 276), which needs a total of 18 bits. This conventional approach covers the full range of the carrier bandwidth. However, to reduce the signaling overhead, startingRB can be indicated relative to the start of the initial downlink (DL) bandwidth part (BWP), and the bit width of the two fields can be determined based on the bandwidth of the initial DL BWP. For example, if the initial DL BWP has 24 resource blocks (RBs), the two fields need only 5+5=10 bits to communicate the required configuration information. As another example, if the initial DL BWP has 96 RBs, the two fields need only 7+7=14 bits to communicate the requirement configuration information.

In a further alternative, the parameter freqBand may be simplified as it may always be equal to the size of initial DL BWP at least for some type of initial BWP, for example, when initial BWP size is less than 52 RB.

In a further option, the QCL indication and the TRS configuration index may be combined. This can be done if it is assumed that there is at most one TRS configuration per beam, and the QCL-ed SSB index can be also used as the TRS configuration index. It is reasonable to assume that there is at most one TRS configuration per beam because the connected UEs on the same beam typically share the same TRS configuration.

For the parameter, firstOFDMSymbolInTimeDomain, a base station (e.g., gNB) cannot indicate all symbols index. For frequency range FR1, only symbols {4, 5, 6} can be indicated. For frequency range FR2, symbols 0 through 9 can be indicated. To further reduce overhead, the symbol location and slot offset may be jointly indicated since in some slots with SSB/SS0, some symbols cannot be used.

For the parameter, periodicityAndOffset, the periodicity may be predefined. e.g., the same as SSB periodicity or separately indicated. The offset can be determined by associated SSB location, e.g., a 1 or 2 slot offset Using the above approaches, an example is presented below, and illustrated in FIGS. 6 and 7, to show how the TRS configurations can be signaled as a list of TRS configurations. With this structure, the size of each TRS resource configuration is reduced to 61 bits, in contrast to 48 or 26 bytes with the existing signaling. With 64 TRS configurations, it requires roughly 64*8=512 bytes (4096 bits). However, it can be seen that it is still larger than the current limit of 2976 bits for SI messages in physical layer. Note that this example does not include all the potential optimizations discussed in Option 1. It is possible to further reduce the size, but the limit of 2976 bits is rather restrictive for up to 64 TRS configurations.

To provide further signaling efficiencies, some parameters can be allowed to be shared across multiple TRS configurations. In one alternative, a configuration signal may indicate a default parameter, whereby that parameter is applicable to all the TRS configurations by default. In a further alternative, and to allow the flexibility of indicating a different value for one TRS configuration, an optional field can be included for that different TRS configuration. Here, the optional field can be used to override the default value in this different TRS configuration.

For example, the parameter freqBand is a good candidate for such a default parameter, because it is very likely that all or most TRS configurations share the same frequency allocation. Thus, using one default parameter for all or most TRS configurations provides a significant saving in the size of information needed for the parameter freqBand.

Below is another example that shows how a common parameter can be defined for the TRS, where commonFreqBand provides a default frequency allocation for all the TRS configurations. If all the TRS configurations share the same frequency allocation, there is no need to signal it separately for each TRS configuration.

But the signaling allows a TRS configuration to override the default frequency allocation when needed, by including an optional parameter specificFreqBand in a TRS resource configuration.

With 64 TRS configurations, assuming they all share the same frequency allocation, the signaling can be reduced to approximately 18+64*43=2770 bits, which falls below the current limit of 2976 bits.

Other potential candidates for the default parameter approach include firstOFDMSymbolInTimeDomain, firstOFDMSymbolInTimeDomain, powerControlOffsetSS, scramblingID, etc., since all or most TRS configurations share the same parameter values, and therefore a default indication is sufficient.

FIG. 6 illustrates a TRS resource configuration information element, according to some aspects of this disclosure. For each of the TRS resources, there are two sub-elements in the information structure, a TRS-Resource sub-element and a CSI-FrequencyOccupation sub-element. The TRS-Resource sub-element has the following entities, as described above: trs-ResourceId (an example of a first parameter indicating an index of the TRS-Resource), frequencyDomainAllocation (an example of a second parameter indicating a frequency domain allocation using 2 bits having enumerated values of 0, 1, 2, 3), firstOFDMSymbolInTimeDomain (an example of a third parameter using 4 bits to indicate the location of a first symbol in a slot, and supporting, for example, integer values 0 . . . 13), freqBand (an example of a frequency band element that includes a ninth parameter indicating a starting resource block of a CSI resource and a tenth parameter indicating a number of resource blocks across which the CSI resource spans, with these parameters elaborated in the CSI-FrequencyOccupation sub-element), powerControlOffsetSS (an example of a fourth parameter using 2 bits to indicate a ratio of energy or power, and having exemplary enumerated values of db−3, db0, db3, db6), a scramblingID (an example of a fifth parameter indicating a scrambling index of a channel state information reference signal (CSI-RS) sequence), periodicityAndOffset (an example of a sixth parameter indicating a transmission period and a slot offset of a CSI-RS resource), qcl-InfoSSBIndex (an example of a seventh parameter using no more than 6 bits, and indicating a corresponding synchronization signal block (SSB) index, and supporting exemplary integer values of 0 . . . 63), and numOfSlots (an example of an eighth parameter using 1 bit, and indicating a number of slots, the number of slots indicating whether the TRS configuration is a 1-slot configuration or a 2-slot configuration, and supporting enumerated values of 1, 2). As noted above, the CSI-FrequencyOccupation sub-element elaborates an example of the frequency band element that includes a ninth parameter indicating a starting resource block of a CSI resource and a tenth parameter indicating a number of resource blocks across which the CSI resource spans. Alternatively, freqBand can be replaced by startingRB and nrofRBs directly. Various aspects of the approaches herein may use one or more of the above parameters with differing number of bits used in forming a TRS resource configuration information element. It is further noted that a base station transmits the TRS resource configuration information element to a user equipment (UE) using a downlink signal.

FIG. 7 illustrates a TRS resource configuration information element, according to some aspects of this disclosure. In this aspect, a commonFreqBand element (representing the CSI-FrequencyOccupation) is used that is generic or common across all TRS resources. As described above, this generic element does not need to be repeated unless the specific TRS resources uses a frequency (e.g., a specific FreqBand element that overrides the generic element) different from the generic frequency identified in common-FreqBand element. Thus, in this aspect, FIG. 7 shows, for each of the TRS resources, two sub-elements in the information structure, a TRS-Resource sub-element and a CSI-FrequencyOccupation sub-element. The TRS-Resource sub-element has the following entities, as described above: trs-ResourceId (an example of a first parameter indicating an index of the TRS-Resource), frequencyDomainAllocation (an example of a second parameter indicating a frequency domain allocation using 2 bits having enumerated values of 0, 1, 2, 3), firstOFDMSymbolInTimeDomain (an example of a third parameter using 4 bits to indicate the location of a first symbol in a slot, and supporting, for example, integer values 0 . . . 13), specificfreqBand (elaborated in the CSI-FrequencyOccupation sub-element), powerControlOffsetSS (an example of a fourth parameter using 2 bits to indicate a ratio of energy or power, and having exemplary enumerated values of db−3, db0, db3, db6), a scramblingID (an example of a fifth parameter indicating a scrambling index of a channel state information reference signal (CSI-RS) sequence), periodicityAndOffset (an example of a sixth parameter indicating a transmission period and a slot offset of a CSI-RS resource), qcl-InfoSSBIndex (an example of a seventh parameter using no more than 6 bits, and indicating a corresponding synchronization signal block (SSB) index, and supporting exemplary integer values of 0 . . . 63), and numOfSlots (an example of an eighth parameter using 1 bit, and indicating a number of slots, the number of slots indicating whether the TRS configuration is a 1-slot configuration or a 2-slot configuration, and supporting enumerated values of 1, 2). As noted above, the CSI-Frequency-Occupation sub-element elaborates an example of the frequency band element that includes a ninth parameter indicating a starting resource block of a CSI resource and a tenth parameter indicating a number of resource blocks across which the CSI resource spans. Various aspects of the approaches herein may use one or more of the above parameters with differing number of bits used in forming a TRS resource configuration information element. Again, it is further noted that a base station transmits the TRS resource configuration information element to a user equipment (UE) using a downlink signal.

Figure 8:
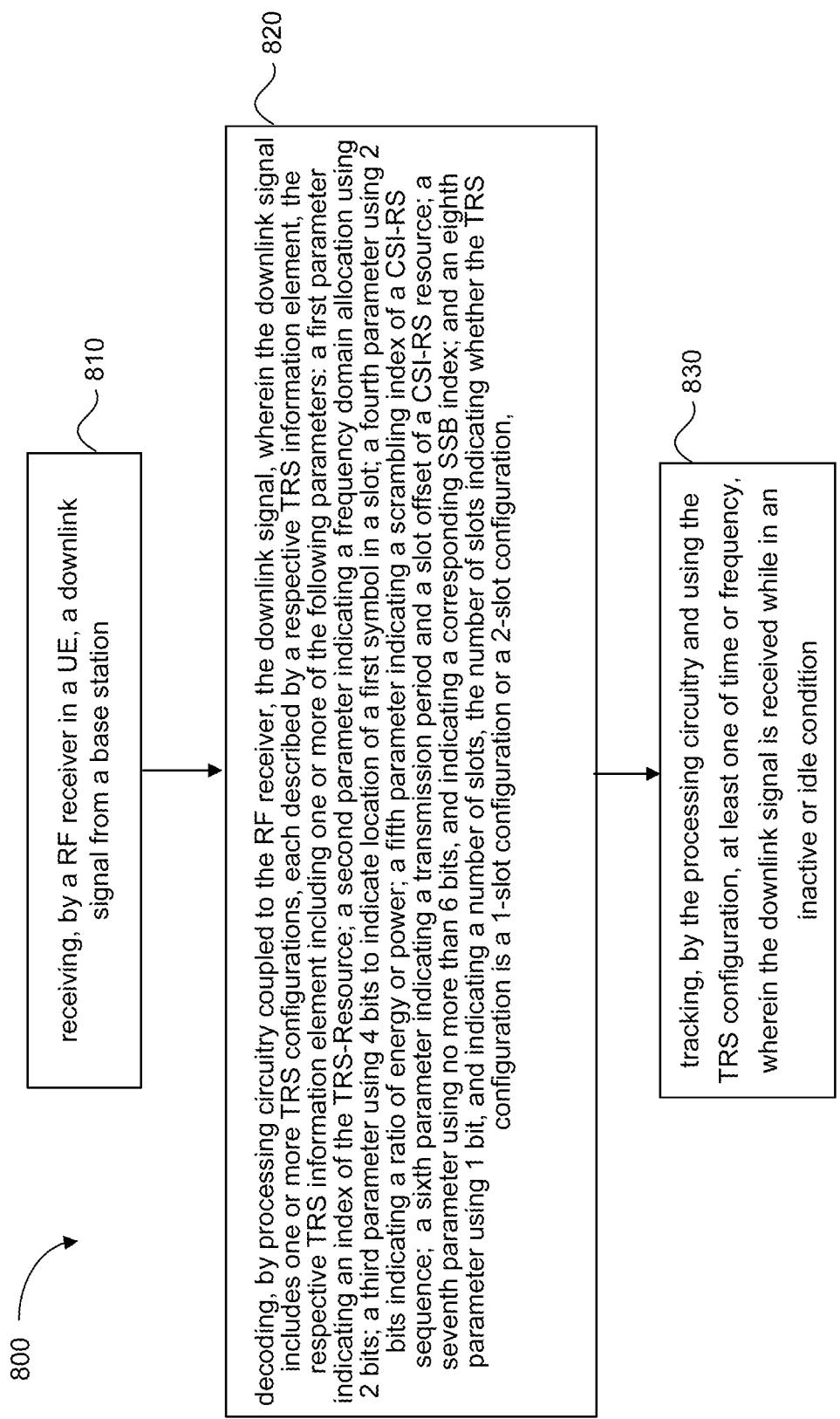
FIG. 8 illustrates a flowchart diagram of a method 800 for tracking either time or frequency in a wireless communication system using an efficient TRS configuration signaling approach, in accordance with aspects of the present disclosure.

FIG. 8 illustrates a flowchart diagram of a method 800 for tracking either time or frequency in a wireless communication system using an efficient TRS configuration signaling approach, in accordance with aspects of the present disclosure. Step 810 includes receiving, by a radio frequency (RF) receiver in a user equipment (UE), a downlink signal from a base station. Step 820 includes decoding, by processing circuitry coupled to the RF receiver, the downlink signal, wherein the downlink signal includes one or more TRS configurations, each described by a respective TRS information element, the respective TRS information element including one or more of the following parameters: a trs-ResourceID parameter (an example of a first parameter indicating an index of the TRS-Resource); a frequencyDomainAllocation parameter (an example of a second parameter indicating a frequency domain allocation using 2 bits having enumerated values of 0, 1, 2, 3); a firstOFDMSymbolInTimeDomain parameter (an example of a third parameter using 4 bits to indicate the location of a first symbol in a slot, and supporting, for example, integer values 0 . . . 13); a powerControlOffsetSS parameter (an example of a fourth parameter using 2 bits to indicate a ratio of energy or power, and having exemplary enumerated values of db−3, db0, db3, db6); a scramblingID parameter (an example of a fifth parameter indicating a scrambling index of a channel state information reference signal (CSI-RS) sequence); a periodicityAndOffset parameter (an example of a sixth parameter indicating a transmission period and a slot offset of a CSI-RS resource); a qcl-InfoSSBIndex parameter (an example of a seventh parameter using no more than 6 bits, and indicating a corresponding synchronization signal block (SSB) index, and supporting exemplary integer values of 0 . . . 63); and a numOfSlots parameter (an example of an eighth parameter using 1 bit, and indicating a number of slots, the number of slots indicating whether the TRS configuration is a 1-slot configuration or a 2-slot configuration, and supporting enumerated values of 1, 2). Step 830 includes tracking, by the processing circuitry and using the TRS configuration, at least one of time or frequency, wherein the downlink signal is received while in an inactive or idle condition.

Option 2: SIB in Different Beam Carries Different Information.

In a second approach to signaling efficiency improvement, the approach may take advantage of the fact that the SIB in one beam carries only the TRS configurations for that particular beam or a subset of all the beams. Relying on this fact can reduce the signaling message size. For each beam, there is typically a single TRS configuration or a very small number of TRS configurations that need to be signaled to the idle or inactive UEs. Given that each TRS configuration takes up to approximately 48 bytes (or 384 bits) when reusing the existing signaling, this approach addresses the problem of fitting the configuration information into the current limit of 2976 bits and significantly reduces the overhead.

In pursuing this approach, however, there may be confusion for a UE as to which beam the SIB signaling corresponds to. Such a confusion exists if the UE is located in the overlapping region of two beams and the monitoring space for the SIB signaling from the two beams also overlaps. However, the aspects herein provide three different options to handle this confusion. In the first option, the approach is to leave it to the base station (e.g., gNB) to ensure configurations whereby the monitoring space from two adjacent beams do not overlap.

In the second option, the approach is to introduce an explicit beam index indication in the SIB message. This can be achieved by adding a field in the SIB message to indicate the beam index.

In the third option, the approach is to introduce an implicit beam index indication in the SIB message. This can be achieved via at least one of the following. First, the base station (e.g., gNB) can scramble the transmitted signal (PDCCH and/or PDSCH) with the relevant beam index. Second, the base station (e.g., gNB) can scramble the CRC of the PDCCH and/or PDSCH with the relevant beam index.

Option 2 may require the UE to acquire a new SIB message whenever it switches the monitoring beam. It is noted that this acquisition can occur frequently, especially when the beam is narrow. Alternatively, the UE can store the SIB message for different beams to reduce the need for SIB monitoring.

Figure 9:
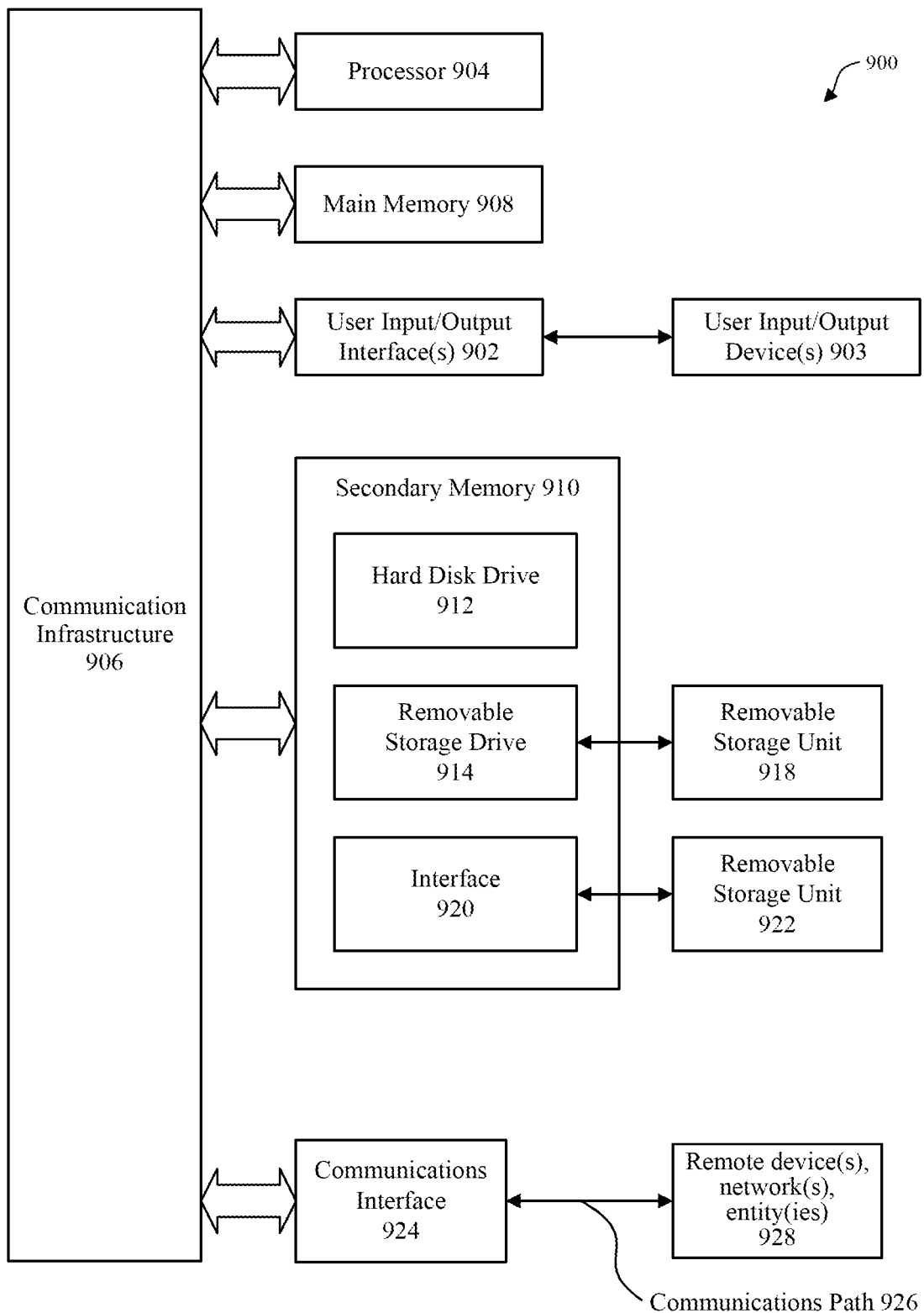
FIG. 9 is an example computer system for implementing some aspects or portion(s) thereof.

Various aspects can be implemented, for example, using one or more computer systems, such as computer system 900 shown in FIG. 9. Computer system 900 can be any well-known computer capable of performing the functions described herein such as devices 101, 103, 105 of FIG. 1, or 200 of FIG. 2. Computer system 900 includes one or more processors (also called central processing units, or CPUs), such as a processor 904. Processor 904 is connected to a communication infrastructure 906 (e.g., a bus.) Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some aspects, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and may include any combination of LANs, WANs, the Internet, etc. Control logic and/or data may be transmitted to and from computer system 900 via communication path 926.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 9. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect." "an example aspect," or similar phrases, indicate that the aspect described may include a particular feature, structure, or characteristic, but every aspects may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates aspects in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data.

What is claimed is:

1. A user equipment (UE) comprising:
a radio frequency (RF) receiver configured to receive a downlink signal from a base station; and
processing circuitry coupled to the RF receiver, the processing circuitry configured to decode the downlink signal, wherein the downlink signal includes at least one tracking reference signal (TRS) configuration, the at least one TRS configuration described by a respective TRS information element, the respective TRS information element including one or more of the following parameters:
a first parameter indicating an index of a TRS-Resource;
a second parameter indicating a frequency domain allocation;
a third parameter indicating a location of a first symbol in a slot;
a fourth parameter indicating a ratio of energy or power;
a fifth parameter indicating a scrambling index of a channel state information reference signal (CSI-RS) sequence;
a sixth parameter indicating a transmission period and a slot offset of a CSI-RS resource;
a seventh parameter indicating a corresponding synchronization signal block (SSB) index; and
an eighth parameter indicating a number of slots, the number of slots indicating whether the at least one TRS configuration is a 1-slot configuration or a 2-slot configuration, or any combination thereof,
the processing circuitry further configured, using the at least one TRS configuration and the RF receiver, to track at least one of time or frequency,
wherein the downlink signal is received while in an inactive or idle condition, and wherein a total bit count of all of the respective TRS information elements for the at least one TRS configuration does not exceed 2976 bits.

2. The UE of claim 1, wherein the respective TRS information element has a bit count not exceeding 61 bits.

3. The UE of claim 1, wherein the one or more parameters further comprise:
a frequency band element that includes a ninth parameter indicating a starting resource block of a CSI resource and a tenth parameter indicating a number of resource blocks across which the CSI resource spans.

4. The UE of claim 3, wherein the frequency band element is common to all the at least one TRS configurations.

5. The UE of claim 1, wherein the respective TRS information element includes only TRS configuration information for a beam over which the downlink signal is transmitted or a subset of beams that includes the beam.

6. The UE of claim 1, wherein one or more of the following parameters are absent from all of the respective TRS information elements: repetition, trs-info, nrofPorts, firstOFDMSymvolInTimeDomain2, cdm-Type, density, and powerControlOffset.

7. A method comprising:
receiving, by a radio frequency (RF) receiver in a user equipment (UE), a downlink signal from a base station; and
decoding, by processing circuitry coupled to the RF receiver, the downlink signal, wherein the downlink signal includes at least one tracking reference signal (TRS) configuration, the at least one TRS configuration described by a respective TRS information element, the respective TRS information element including one or more of the following parameters:
a first parameter indicating an index of a TRS-Resource;
a second parameter indicating a frequency domain allocation;
a third parameter indicating a location of a first symbol in a slot;
a fourth parameter indicating a ratio of energy or power;
a fifth parameter indicating a scrambling index of a channel signal information reference signal (CSI-RS) sequence;
a sixth parameter indicating a transmission period and a slot offset of a CSI-RS resource;
a seventh parameter indicating a corresponding synchronization signal block (SSB) index; and
an eighth parameter indicating a number of slots, the number of slots indicating whether the at least one TRS configuration is a 1-slot configuration or a 2-slot configuration, and
tracking, by the processing circuitry and using the at least one TRS configuration, at least one of time or frequency,
wherein the downlink signal is received while in an inactive or idle condition, and
wherein a total bit count of all of the respective TRS information elements for the at least one TRS configuration does not exceed 2976 bits.

8. The method of claim 7, wherein the respective TRS information element has a bit count not exceeding 61 bits.

9. The method of claim 7, wherein the one or more parameters further comprise:
a frequency band element that includes a ninth parameter indicating a starting resource block of a CSI resource and a tenth parameter indicating a number of resource blocks across which the CSI resource spans.

10. The method of claim 7, wherein the respective TRS information element includes only TRS configuration information for a beam over which the downlink is transmitted or a subset of beams that includes the beam.

11. The method of claim 10, wherein a time-frequency resource for the downlink signal in one beam is configured by the base station to be non-overlapping with a time-frequency resource for another beam.

12. The method of claim 7, wherein one or more of the following parameters are absent from all of the respective TRS information elements: repetition, trs-info, nrofPorts, firstOFDMSymvolInTimeDomain2, cdm-Type, density, and powerControlOffset.

13. A base station comprising:
processing circuitry configured to encode a downlink signal, wherein the downlink signal includes at least one tracking reference signal (TRS) configuration, the at least one TRS configuration described by a respective TRS information element, the respective TRS information element including one or more of the following parameters:
a first parameter indicating an index of a TRS-Resource;
a second parameter indicating a frequency domain allocation;
a third parameter indicating a location of a first symbol in a slot;
a fourth parameter indicating a ratio of energy or power;
a fifth parameter indicating a scrambling index of a channel state information reference signal (CSI-RS) sequence;
a sixth parameter indicating a transmission period and a slot offset of a CSI-RS resource;
a seventh parameter indicating a corresponding synchronization signal block (SSB) index; and
an eighth parameter indicating a number of slots, the number of slots indicating whether the at least one TRS configuration is a 1-slot configuration or a 2-slot configuration, and
a radio frequency (RF) transmitter, coupled to the processor circuitry, the RF transmitter configured to transmit the downlink signal to a user equipment (UE),
wherein the downlink signal is transmitted while the UE is in an inactive or idle condition so that the UE can track at least one of time or frequency using the at least one TRS configuration, and
wherein a total bit count of all of the respective TRS information elements for the at least one TRS configuration does not exceed 2976 bits.

14. The base station of claim 13, wherein the respective TRS information element has a bit count not exceeding 61 bits.

15. The base station of claim 13, wherein the one or more parameters further comprise:
a frequency band element that includes a ninth parameter indicating a starting resource block of a CSI resource and a tenth parameter indicating a number of resource blocks across which the CSI resource spans.

16. The base station of claim 15, wherein the frequency band element is common to all the at least one TRS configurations.

17. The base station of claim 16, wherein the respective TRS information element further defines a specific frequency band parameter that overrides the frequency band element.

18. The base station of claim 13, wherein the respective TRS information element includes only TRS configuration information for a beam over which the downlink signal is transmitted or a subset of beams that includes the beam.

19. The base station of claim 18, wherein the respective TRS information element further includes a beam index indication of the beam.

20. The base station of claim 13, wherein one or more of the following parameters are absent from all of the respective TRS information elements: repetition, trs-info, nrof-Ports, firstOFDMSymvolInTimeDomain2, cdm-Type, density, and powerControlOffset.

* * * * *